June 5, 1923.
C. E. FREDERICKSON
1,457,733
TURNING STEERING WHEEL AND LOCK
Original Filed Feb. 10, 1921
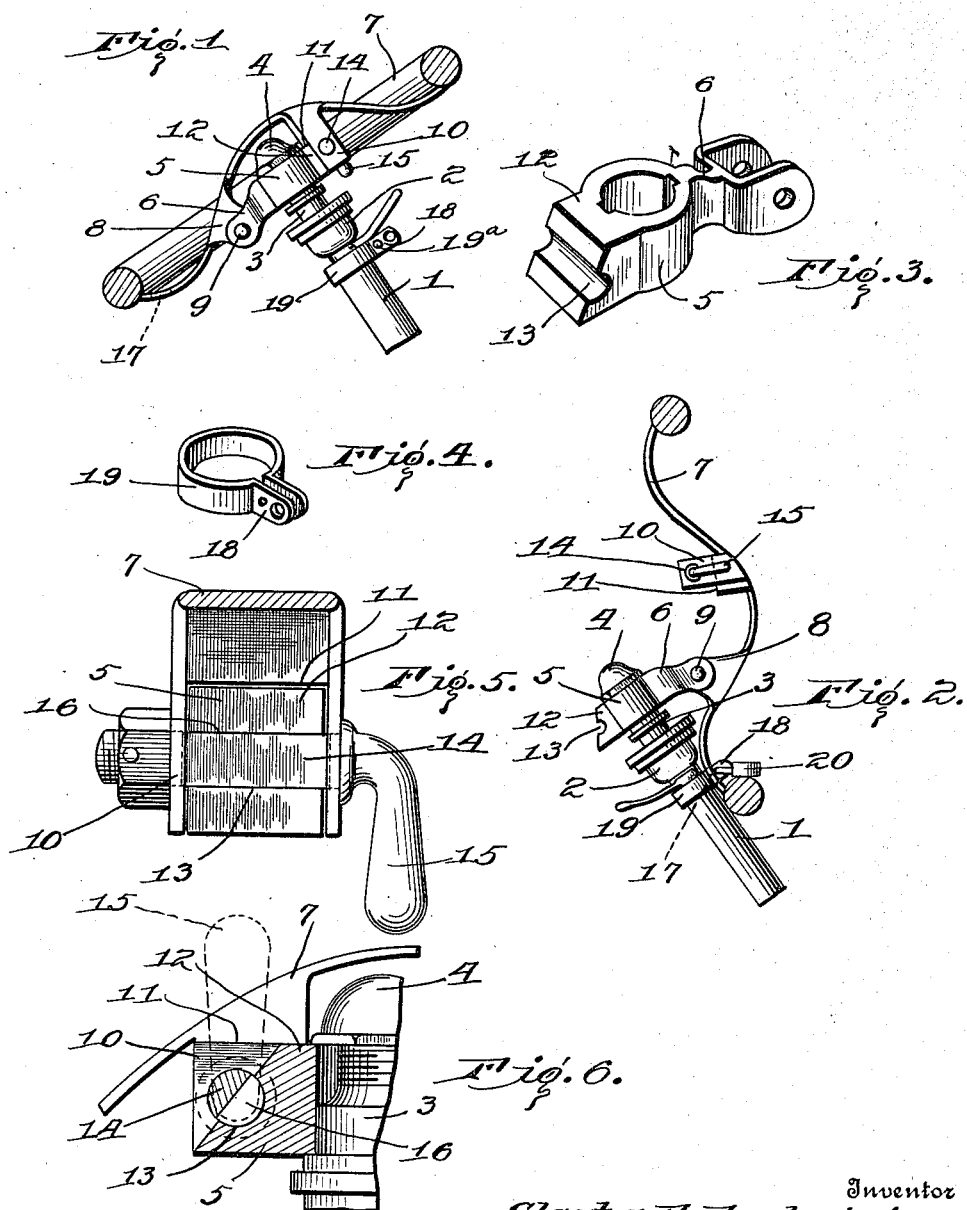
Inventor
Clayton E. Frederickson.
By Fred G. Dieterichs
Attorney Patented June 5, 1923.

1,457,733

UNITED STATES PATENT OFFICE.

CLAYTON E. FREDERICKSON, OF CHICAGO, ILLINOIS.

TURNING STEERING WHEEL AND LOCK.

Application filed February 10, 1921, Serial No. 443,901. Renewed March 19, 1923.

*To all whom it may concern:*

Be it known that I, CLAYTON E. FREDERICKSON, a citizen of the United States, residing at Chicago, in the county of Cook and State of Illinois, have invented certain new and useful Improvements in Turning Steering Wheels and Locks, of which the following is a specification.

My invention has for its primary object to provide a lock for automobile steering gears of the type having sun and planet gears contained in a box below the steering wheel and at the top of the steering post or column and although my invention is especially adapted for this type of steering gear, it will be quite obvious that its use is not limited thereto.

Heretofore in automobiles of the type described, locks have been provided for securing the steering wheel against turning, when desired, but they have not been effective as an anti-theft lock because of the fact that by unscrewing the cap of the gear box and removing the planet gears, then replacing the solid gear, the car could be towed away; this objection my invention has been designed to avoid.

Generically, the invention consists of an attachment designed to be placed on the steering spindle in lieu of the old steering wheel, which is removed and a new steering wheel is hinged to the attachment and held in the normal or running position by a bolt which may be moved to release the connection, when it is desired to lock the car, i. e., to tilt the steering wheel over and lock it down to a clamp or lug on the steering post; the locking connection between the steering wheel and the lug is a rigid one so as to prevent the raising of the attachment, which will be necessary in order to unscrew the gear case cover and also to prevent the removal of the attachment from the spindle if the top nut is taken off.

In its subordinate nature, the invention also includes those novel details of construction, combination and arrangement of parts, all of which will be first fully described, then be specifically pointed out in the appended claims, reference being had to the accompanying drawings, in which:

Figure 1 is a side elevation of my invention, in use, in the normal position.

Figure 2 is a similar elevation of the parts in the locked position.

Figure 3 is a detail perspective view of the steering wheel attachment.

Figure 4 is a detail perspective view of the lug clamp that goes on the steering post.

Figure 5 is a detail elevation showing the holding bolt that secures the wheel in the normal position.

Figure 6 is a cross section showing the manner in which the holding bolt operates.

In the drawings in which like numerals and letters of reference designate like parts in all of the figures, 1 represents the steering post, 2 the gear box, 3 the spindle to which the usual steering wheel is secured and 4 the top nut which holds the steering wheel on the spindle.

When my invention is to be applied, the old steering wheel is removed and an attachment 5 is substituted therefor. This attachment has a hole to fit on the spindle 3 in the same manner as did the old steering wheel and it too is held by the top nut 4 which is replaced.

The attachment 5 has an arm or bracket portion 6 that extends radially.

The new wheel 7 has an arm 8 which is hinged to the arm or bracket portion 6 by a suitable rivet pin 9. It also has a bifurcation 10 with a seat 11 which cooperates with the projection 12 of the attachment 5, the seat resting on the top of the projection 12, while the bifurcation 10 straddles the same. The projection 12 has a semi-circular recess 13 to cooperate with the bolt 14 that is mounted in the bifurcation 10 and has a handle 15 by which it may be turned.

The bolt has a removed portion 16, which, when the handle is raised, will register with the recess 13 to release the connection so that the wheel may be tilted over from the position shown in Figure 1 to that shown in Figure 2.

One arm of the wheel spider has a slot 17 to receive the lug or ear 18 of a clamp which fits on the steering post beneath the gear box but as close to the same as possible, so that it may not be raised higher. This lug or ear 18 is formed by the ends of the clamp 19 which consists of hard strap metal bent around the steering post with its ends secured together by a rivet 19a and projecting from the steering post to form the ears 18. The ears 18 have a hole through which a padlock 20 may be passed to secure the parts together, thus locking the wheel in the tilted down position, where it bears against the steering post and is so shaped as to lie against the gear box, thereby holding the steering wheel against movement, when locked, and thus preventing the necessary play which would be required to lift off the attachment from the spindle should the top nut be removed.

In use, the clamp is placed on the steering post in such position that the ear 18 will point toward the front, the steering wheel being so placed that the slot 17 is in the rear (one hundred and eighty degrees around from the ear) in the driving position. Then, when it is desired to lock the machine, the steering wheel is given a half turn and the bolt handle is raised to release it from the attachment so that the steering wheel may be swung over into engagement with the ear 18 (see Figure 2) and a padlock is placed to secure the parts together.

When so secured, the front wheels of the vehicle will be turned toward one side or the other, preferably toward the curb, depending upon the direction in which the steering wheel is turned to locking position.

If desired, the steering wheel may be put on so that its slot 17 may be to the front, in which event, the wheels can be locked straight ahead.

From the foregoing description taken in connection with the accompanying drawings, it is thought the complete construction, operation and advantages of my invention will be clear to those skilled in the art to which it appertains.

What I claim is:

1. The combination with the steering post and the steering spindle; an attachment secured on the spindle, a steering wheel hinged to said attachment, a releasable means to secure said wheel and attachment together to permit hinged movement, an ear on the steering post, said wheel having a slotted arm designed to hold said wheel from movement, means to lock said wheel and ear together, said attachment comprising a body having a projection and having an arm provided with one element of a hinged joint, said wheel including a spider having another element of the hinged joint and having a bifurcated member to fit over said projection when the wheel is in the normal position, and a releasable connection between said bifurcated member and said projection to hold the wheel in the normal position.

2. The combination with the steering post and the steering spindle; an attachment secured on the spindle, a steering wheel hinged to said attachment, a releasable means to secure said wheel and attachment together to permit hinged movement, an ear on the steering post, said wheel having a slotted arm designed to receive said ear, when said wheel is swung over on its hinge, to hold said wheel from movement, means to lock said wheel and ear together, said attachment comprising a body having a projection and having an arm provided with one element of a hinged joint, said wheel including a spider having another element of the hinged joint and having a bifurcated member to fit over said projection when the wheel is in the normal position, and a releasable connection between said bifurcated member and said projection to hold the wheel in the normal position, said attachment, said ear and said spider being so relatively designed that said wheel will engage the steering post, when locked tilted, to prevent said wheel being moved in a manner to allow said attachment to be disconnected from the steering spindle or steering post.

CLAYTON E. FREDERICKSON.